NONDESTRUCTIVE MEMORY WITH HALL VOLTAGE READOUT

Filed July 25, 1967 2 Sheets-Sheet 1

INVENTOR.
HORST ARNDT
BY Westell & Hanley

NONDESTRUCTIVE MEMORY WITH HALL VOLTAGE READOUT

Filed July 25, 1967 2 Sheets-Sheet 2

INVENTOR.
HORST ARNDT
BY Westell & Hanley

United States Patent Office 3,521,255

Patented July 21, 1970

3,521,255

NONDESTRUCTIVE MEMORY WITH HALL VOLTAGE READOUT

Horst Arndt, Ottawa, Ontario, Canada, assignor to Northern Electric Company Limited, Montreal, Quebec, Canada Filed July 25, 1967, Ser. No. 655,793
Int. Cl. G11c *11/18, 7/00*
U.S. Cl. 340—174 11 Claims

ABSTRACT OF THE DISCLOSURE

The invention describes a Hall probe element used as a nondestructive memory device where a pair of conductors is used firstly to provide magnetization impulses to the field producing member affecting the Hall probe element and secondly to carry the "read" or "sense" to such element. Another pair of conductors is provided for each Hall probe element to carry the other of the "read" or "sense" signals. Preferably field switching will require the magnetizing effect of both pairs of conductors. Preferably the Hall probe elements are arranged in rectangular array, with a pair of such conductors for each row and a pair of such conductors for each column.

This invention relates to a nondestructive read-out memory element, and to a memory constructed therefrom.

It is an object of this invention to provide a memory and an element therefor where the information may be permanently stored and read out, without needing to restore the information when it is read out.

It is an object of this invention to provide a memory wherein the speed is increased by the elimination of the switching process from the read-out cycle.

By "permanently magnetizable material," I mean, a material which may, by the impression of magnetizing flux thereon, acquire a polarity of magnetization which it will retain until magnetizing flux of more than a predetermined amount, of the opposite to the original polarity is applied, at which time the polarity of magnetization may be switched, and where the switching may be repeated in the same manner. It will be found that with the embodiments of the invention shown, that the "squarer" the curve of the hysteresis curve (i.e. the closer its approach to a rectangular form), the more the operation of the circuit shown is facilitated.

The invention provides a Hall probe element having opposed control terminals and opposed sense terminals and a permanently magnetizable element located, when magnetized, to create a magnetic field encompassing said Hall probe element. There is provided a pair of conductors arranged, when connected in series and energized, by a "write" signal or pulse to create a field tending to magnetize said permanently magnetizable material, and said conductors are respectively connected to the opposed control terminals of said Hall probe element. A second pair of conductors are connected to the respective sense terminals. With such arrangement it will be seen that the energization of such conductors, when connected in series, may be in such magnitude and amount as to produce magnetization of the permanently magnetizable material in the sense determined by the polarity of the energizing current. Once such magnetization has created a magnetic field influencing the Hall element, the series connection between said first pair of conductors may be disconnected and a "read" energization may be applied across the same set of conductors, now open circuited; and, in accord with the Hall effect, a signal with polarity determined by that of the permanently magnetizable material field and of the "read" energization is produced at the sense terminals. Thus the state of the field may indicate one or the other of the binary states, and may be read out in the manner set out above. It is noted that such "read-out" is nondestructive and hence the information remains in the memory after the "read-out" has been made. Moreover since no switching is involved in the read-out, the memory speed is increased by the elimination of the normal switching time.

In a preferred form a plurality of Hall probe elements connected as above are combined in a memory.

Each portion of permanently magnetizable material corresponding to a Hall probe element is, in such arrangement, to be magnetized by the contemporaneous energization of two pairs of conductors where the quantum of energization in each pair of conductors is chosen in relation to the hysteresis curve of the permanently magnetizable material so that magnetization by one pair of conductors only, even if repeated, is not sufficient to switch the polarity of the permanently magnetizable portion which may only be switched by contemporaneous energization in the same polarity by both pairs of conductors.

The plurality of Hall probe elements forming the memory and their individually corresponding permanently magnetizable portions, or members, are wired by first and second pairs of conductors so that the combination of a particular first pair of conductors and a particular second pair of conductors which will magnetize a magnetizable portion in a desired polarity, is unique for each Hall probe. This is most easily considered in connection with a rectangular array of Hall probe elements where a first pair of conductors is provided for the Hall probe element and magnetizable portions for each row in the matrix and a second pair of conductors is provided for the Hall probes and magnetizable portions in each column of the matrix, so that the combination of a particular first and a particular second pair of conductors will be unique for each matrix position. As explained, means will be provided for connecting a first pair of conductors in series at one end and for applying an energizing "write" pulse at the other end. Similar means are provided for each second pair of conductors.

Means are provided for applying a "read pulse" to each first pair of conductors while not connected in series. Such "read" pulse produces for each Hall probe element to which it is applied, a "sense" signal in each second pair of conductors connected to a Hall probe element subjected to such "read" pulse with the polarity of such "sense" signal being determined by the polarity of the Hall element involved. Each pair of connections between a second pair of conductors and a Hall probe preferably contains a rectifying device in the connection so that current may only travel in one way therethrough, and the polarity is the same relative to the two "second pair" conductors involved for all Hall probes connected to the same second pair of conductors. The purpose of the rectifying devices is to prevent the sense voltage being dissipated by the conductance of the Hall probe in parallel with the Hall probe forming the source of the sense signal across the second pair of conductors. It will be seen that such rectifying devices may be dispensed with where the number of Hall elements connected in parallel across second pairs of conductors is small enough that the sense signal, although to some extent dissipated by the Hall elements present is still large enough for detection.

If it is found that the Hall probes "load" first pairs of conductors during the "write" process on the magnetizable elements, then the first pair of conductors will also be connected to the control terminal by means limiting the current flows to one direction only with this direction being the same relative to the two "first pair" conductors involved, for all elements connected to the same first pair of conductors.

Thus to "write" on the magnetic elements in one sense, energization is applied across a first or second pair of conductors at one end and the other ends are connected, the ends for energization and connection being selected in relation to the polarity of energization so that the correct magnetizing polarity of current flow is selected to produce the correct polarity of magnetization but also so that the potential across the Hall element is in the opposite direction to that allowed by the rectifying device in the Hall terminal connections to the respective conductors. It will be noted that with such arrangement, the polarities of any pairs of conductors remains the same but the energization originates at opposite ends of such conductors depending on the polarity of the "write information" being imposed on a memory element. The "read" pulse is imposed on one first pair of conductors in the polarity to be passed by the rectifying element in the Hall probe connections to said first pair of conductors, and with the series connection between said first pair of conductors open.

In drawings which illustrate a preferred embodiment of the invention:

Figure 1:
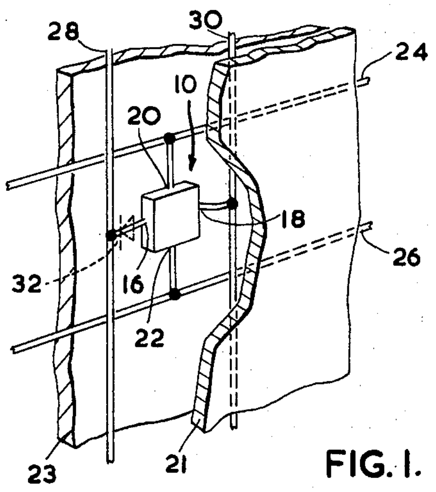
FIG. 1 shows a perspective enlarged view of a Hall probe element in accord with the invention.

In FIG. 1 is shown a Hall probe element 10 which may be of a well-known and conventional design and has two long dimensions and a short thickness dimension. Along two opposed sides (looking at the device in the plane defined by the two long dimensions) are control terminals 20 and 22.

Along the other two opposed sides are located the sense terminals 16 and 18. Located above and below the Hall effect probe are sheets of a permanently magnetizable material 21 and 23. As will be later explained, the Hall probe element shown in FIG. 1 will usually be used with a plurality of such probes, and it is desirable although not necessary to use a permanently magnetizable material which is locally magnetizable so that one sheet of the permanently magnetizable material overlies and another sheet of such material preferably underlies all the Hall elements. Naturally single sheets of permanently magnetizable material can only be provided for a plurality of elements if such sheets are independently locally magnetizable. In order to shorten the air gaps in the magnetic path through the sheets, permanently magnetizable material is preferably placed both above and below the Hall probe elements.

In accord with this invention, ferrite is thought to be the best permanently magnetizable material and has the quality of being locally independently magnetizable so that one magnetized area does not affect the magnetic polarity of magnetization in another area. It will be appreciated that where it is desired that two sheets of permanently magnetizable material are used to both overlie and underlie a plurality of Hall effect probe, that the material need not be ferrite but must be material which is independently permanently magnetizable in localized areas. On the other hand, if each Hall effect probe individually corresponds to physically separate permanently magnetizable material which exerts the magnetic field for the individual element, then permanently magnetizable material may be used which may not be independently locally magnetized.

A first pair of conductors 24 and 26 is shown connected to the control terminals 20 and 22 with the conductors extending therefrom in both directions. A pair of conductors 28 and 30 is shown connected to the sense terminals 16 and 18 and extending on each side therefrom. The connections between the pair of conductors 28 and 30 and the Hall effect probe 10 will preferably include a rectifying device, here a diode 32.

With the device as shown in FIG. 1, it will be seen that by applying a potential across the left hand end of the conductors 24 and 26 while the right hand ends are connected, so that conductors 24 and 26 are connected in series, the portions of the ferrite sheets 21 and 23 can be magnetized in either polarity as determined by the applied potential. This is one form of the "write" operation. In the other form of the "write" operation the magnetization of ferrite sheets 21 and 23 is effected by the additive magnetic effects of contemporaneous series connection and energization in both conductors 24 and 26 and conductors 28 and 30.

With the series connection broken between conductors 24 and 26, a "read" pulse may then be applied across conductors 24 and 26. If the rectifying device 32 is omitted then a sense pulse will be detected across conductors 28 and 30, in a polarity indicating one or the other magnetic states of the locally magnetized portions of sheets 21 and 23, one of which will be chosen to represent binary digit "1" and the other to represent binary digit "0." If the rectifying device 32 is included in the circuit, then the application of the "read" pulse will result in a sense pulse when the polarity is such as to pass through device 32 and no pulse when the polarity is in the opposite sense. Thus no pulse will indicate one binary digit and a pulse will indicate the other. If it is found that the Hall probe element "loads" the series circuit comprising conductors 24 and 26 during the "write" operation, then a rectifying device may also be placed in the connections to either terminal 20 or terminal 22 with a variation in the manner of applying the "write" pulse as discussed in connection with FIG. 4.

Rather than have the "write" operation performed solely through conductors 24 and 26, it is preferred, to facilitate the use of a large number of such Hall elements, to perform the "write" operation by the contemporaneous application of potentials on conductors 24 and 26 and on conductors 28 and 30 while the said pairs of conductors are series connected. This arrangement is discussed in connection with FIGS. 2 and 4.

Figure 2:
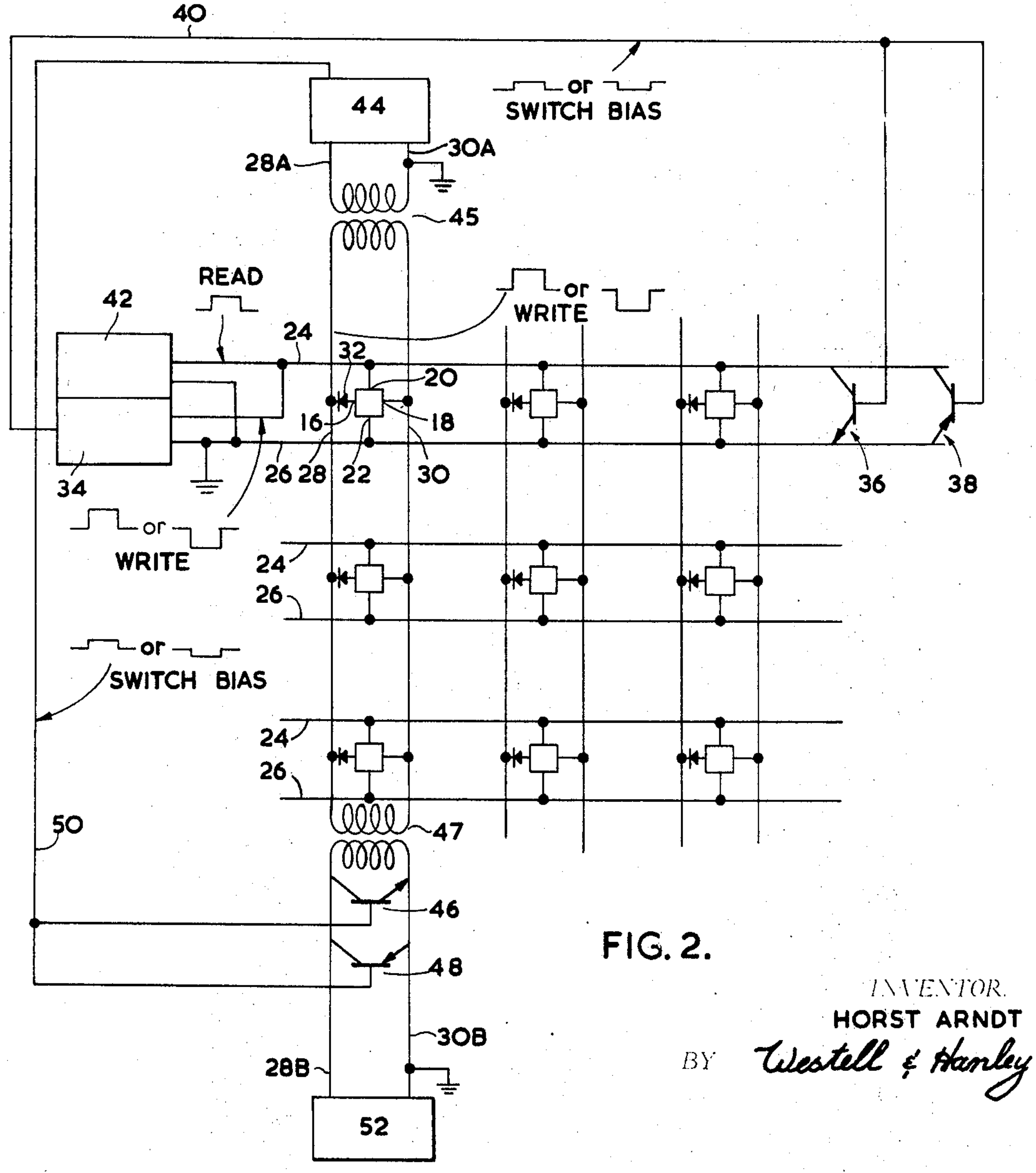
FIG. 2 shows a memory constructed from such Hall probe elements.

In FIG. 2 is shown a rectangular array of Hall probe elements 10 of the type shown in FIG. 1 and it will be understood that, not shown, are ferrite sheets 21 and 23 (as shown partially in FIG. 1) overlying and underlying the whole plurality of Hall probe elements 10. The Hall probe elements 10 are shown as arranged in a rectangular matrix in rows and columns. This need not be physically the case but it will be noted that, if it is not the case, it is the intention of the invention that the Hall probe elements will be wired so that the combination of a first pair of conductors and second pair of conductors will be unique for any one element and therefore that preferably the elements will be connected as if arranged in rows and columns or as if each Hall probe were in one-to-one correspondence to a rectangular array location.

Thus the Hall probe elements are spoken of as if arranged in rows and columns, whether or not this be true, and thus for each row of Hall probe elements there is provided a first pair of conductors 24 and 26 extending between a "write" pulse source 34 at one end and transistor switches 36 and 38 at the other end, the conductors 24 and 26, in between, being located to magnetize the ferrite material in locations to tend to exert the desired magnetic influence on the Hall probe element in the corresponding row. As previously explained, it is necessary that a first pair of conductors 24 and 26 be connected in series during the application of the "write" potential and disconnected at other times. This function may be performed in any desired manner and with any desired circuitry, but one way of performing this is shown, by the transistor switches 36 and 38.

Line 26 is grounded electrically adjacent write pulse source 34. Transistors 36 and 38 are of the NPN and PNP type, respectively with the emitters connected to line 26. A line 41 connects the "write" pulse source 34 to the bases of transistors 36 and 38. As will be noted from the connection between source 34 and line 24, the pulses will be positive for one binary digit and negative for the other binary digit. The pulse source 34 is desined to provide a positive or negative pulse on line 41 relative to line 26 of the required magnitude to bias the base of transistor 36 (positive pulse) or the base switch 38 (negative pulse) switch the respective transistor into conduction. The source 34 is designed so that the sense of the bias pulse is of the same polarity as the write pulse applied to line 24 relative to line 26. Thus a positive pulse from "write" source 34 is accompanied by the closing of transistor switch 36 and causes current flow from left to right on conductor 24 and through switch 36, then from right to left on conductor 26. The magnetic material under the influence of conductors 24 and 26 and influencing the first row of Hall probes is thus "set" in one polarity. A negative pulse from "write" source 34 is accompanied by the closing of transistor switch 38 and causes current flow from left to right in conductor 26 and through switch 38 and from right to left in conductor 24 resulting in the magnetization of the magnetic material corresponding to the first row of Hall probes in the opposite sense from that created by the positive pulse. Since the pulse source 34 is the only source of bias pulses for the bases transistor 36 and 38, it will be een that in the absence of pulses emanating from pulse source 34, the switches 36 and 38 will be open, and the conductors 24 and 26 will be effectively dis-connnected from each other at the end remote from the "write" pulse source.

Also connected across the conductors 24 and 26 is a "read" pulse source 42 adapted, when actuated, to provide pulses in a predetermined sense (here positive) when actuated.

Similar "write" and "read" pulses actuation is provided for each row of the Hall probe matrix, or alternatively a single "write" and a single "read" pulse source may be used for all rows and switched by any desired switching means to the particular row selected.

"Write" pulse actuation, is also provided for each column of the matrix. Corresponding to each column and conductors 28 and 30 connected to the Hall probe elements in the column as described in FIG. 1 and with the conductor 28 connected to sense terminal 16 through a diode 32. Line 30 is grounded as shown.

A "write" pulse source 44 is connected by lines 28A and 30A to the input terminals of a pulse transformer 45 with one of the source terminals (say 30A) grounded; the purpose of source 44 being to supply a positive or negative pulse to line 28. Lines 28 and 30 are connected to the output terminals of pulse transformer 45. The input terminals of a pulse transformer 47 connect lines 28 and 30 on the side of the Hall probes in the column remote from source 44. Transistor switches 46 and 48 connect lines 28B and 30B connected to the output terminals of transformer 47. Transistor 46 is NPN and transistor 48 is PNP, the emitters of both are connected to line 30B and the collectors of both are connected to line 28B. Line 50 connects the "write" pulse source 44 to the bases of transistors 46 and 48 and the "write" source is designed to provide, along line 50, a pulse relative to line 30B (ground) of a magnitude to turn on one of transistors 46 or 48 at the same time as, and in the same sense (as reflected onto lines 28 and 30 across transformer 47) as, the "write" pulse placed by source 44 on lines 28 and 30. Thus a negative pulse on line 28 causes current clockwise through line 30, one of the switches and line 28, about the magnetizable material corresponding to the respective column, with magnetization in the sense corresponding to a positive pulse on line 24.

A positive pulse on line 28 causes the opposite magnetization in the magnetizable material corresponding to the column with the magnetization in the sense corresponding to a negative pulse on line 24. Lines 28 and 30 are effectively connected by the low impedance in the desired sense reflected across transformer 47 by conduction in transistor 46. When "write" pulses are not emitted by the source 44, no pulse is placed on line 50, and the switches 46 and 48 are both open and conductors 28 and 30 are, in effect, unconnected.

Similar switching and pulsing means are provided for each column in the array or else a single switching and pulsing means is provided with means for selecting the column to be energized. It will be realized that any switching means may be used, which allows connection in series of column or row conductors during the application of magnetizing pulses, and their disconnection at other times.

Means 52 for detecting a "sense" pulse is also connected across the lines 28B and 30B with one of the lines (preferably 30B) grounded. Lines 28B and 30B are connected to the output side of a pulse transformer 47. The input side of the pulse transformer 47 is connected to lines 28 and 30 at the opposite end of the column of Hall probes from source 44. The purpose of pulse transformers 45 and 47 is to ensure isolation of sense detector 52 from source 44.

Figure 3:
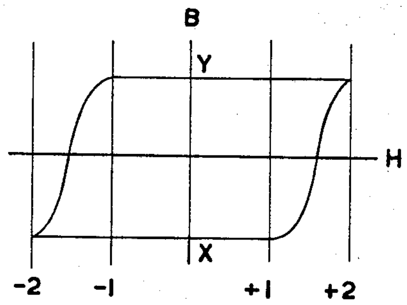
FIG. 3 shows a typical hysteresis curve for permanently magnetizable material used with the invention.

In FIG. 3 is shown the hystereris curve for the portion of two sheets of ferrite material framed when viewed perpendicular to the array by pairs of conductors 24, 26, 28 and 30, and hence arranged to control the magnetic field for a Hall probe element in a particular location in the array. It will be understood that the magnitude of the write pulses applied along row or column conductors, is so arranged that, with no pulse on the line, the state of a locally magnetizable portion will either be in point X or point Y on the curve. Abscissae are shown on the graph, indicating equal values $\pm1$ and then $\pm2$ and the distance indicated by one unit of H being intended to indicate the magnetic energization by a pulse in accord with the design quantum of energization from a single pair of the first or second pair of conductors affecting a Hall probe element at a given location. Thus it will be seen from the curve that, in either position X or position Y, the pulse from a single pair of conductors at a matrix position will not change the magnetic state of the portion of magnetizable material from one state to the other but will merely cause change of the magnetic state from 0 to $\pm1$ and back to 0 after the cessation of the pulse. On the other hand simultaneous pulses on both first and second pairs of conductors at the same matrix position and in the same sense of H will switch the magnetic state from position X to position Y or vice versa depending on the sense of magnetization and the state of the magnetic location may therefore be considered as one binary number for the Y state and the other binary number for the X state.

Thus to write one binary number on the magnetic portion near the upper left matrix location, pulses are applied on the upper row first pair of conductors and the left hand column second pair of conductors in both cases to cause the same sense (clockwise or counter clockwise) current flow relative to the permanently magnetizable material located to exert a field upon the Hall effect probe. These will, in accord with the hysteresis curve of FIG. 3, switch the magnetization to indicate the selected binary state (unless it is already in that state). On the other hand, in each other matrix position associated with either the first pair or second pair of energized conductors in the array, the magnetizable material will be affected by one only of the pulses and its magnetic state will not be changed.

With the upper left memory position and the other memory positions arranged as shown, if it is desired to read the memory then a "read" pulse is sent from the source 42 across the first pair of conductors 24 and 26. This may be sent in either desired sense along the first row of conductors (here positive on line 24). The "read" pulse, it will be noted, does not provide the necessary bias for either of the transistor switches 36 or 38 so that in effect the first conductors will be open circuited. Thus the "read" pulse from the "read" pulse source 42 is applied across the control terminals 20 and 22 of all the Hall elements in a row. Either sense for the "read" pulse source may be selected. In the sense applied and having regard for the state of the corresponding magnetizable portion of elements in the row, a sense signal will be produced at the sense terminals 16 and 18 of each Hall probe element in such row, with the polarity of said signal dependent on the magnetization of the corresponding permanently magnetizable material.

At each Hall probe element in a row (here the first row) a signal of one polarity or the other is produced at the Hall terminals 16 and 18 dependent on the polarity of magnetization of the corresponding permanently magnetizable material. One polarity of such sense signal is blocked by diode 32 and no signal is interpreted as one binary digit at the sense detector 52 corresponding to the column of the first row element involved. The other polarity of such sense signal passes through diode 32 and across pulse transformer 47 to register on the sense detector 52 as the other binary digit. The signal passing through diode 32 of first row Hall probe element is unaffected by the other Hall probe elements in a column since their diodes 32 are all back biased by such signal.

Thus the sense detector 52 for each column gives an indication of the state of magnetization at a Hall probe element characteristic of that column and the energizing row.

It will be noted that the read-out is nondestructive and for a given state of the memory elements the read-out may be repeated as many times as desired without change of such state.

As explained in the introduction, the purpose of the diodes 32 in the embodiment of FIG. 2 is to prevent dissipation of the "sense" signal produced across a second pair of conductors because of "loading" by the Hall elements which are connected to such second pair of conductors and which are in parallel with the Hall element producing the sense signal. It should be noted that diodes 32 may be omitted where the number of Hall elements connected in parallel across a second pair of conductors and a sense detector is small enough so that the dissipation does not reduce the "sense" signal below a level which the sense detector can detect. This will, of course, depend on other factors including the quality of the sense detector, the strength of the memory fields and the strength of the "read" pulse. However the circuitry described herein with the omission of diodes connected to the Hall elements is considered within the scope of the invention.

Figure 4:
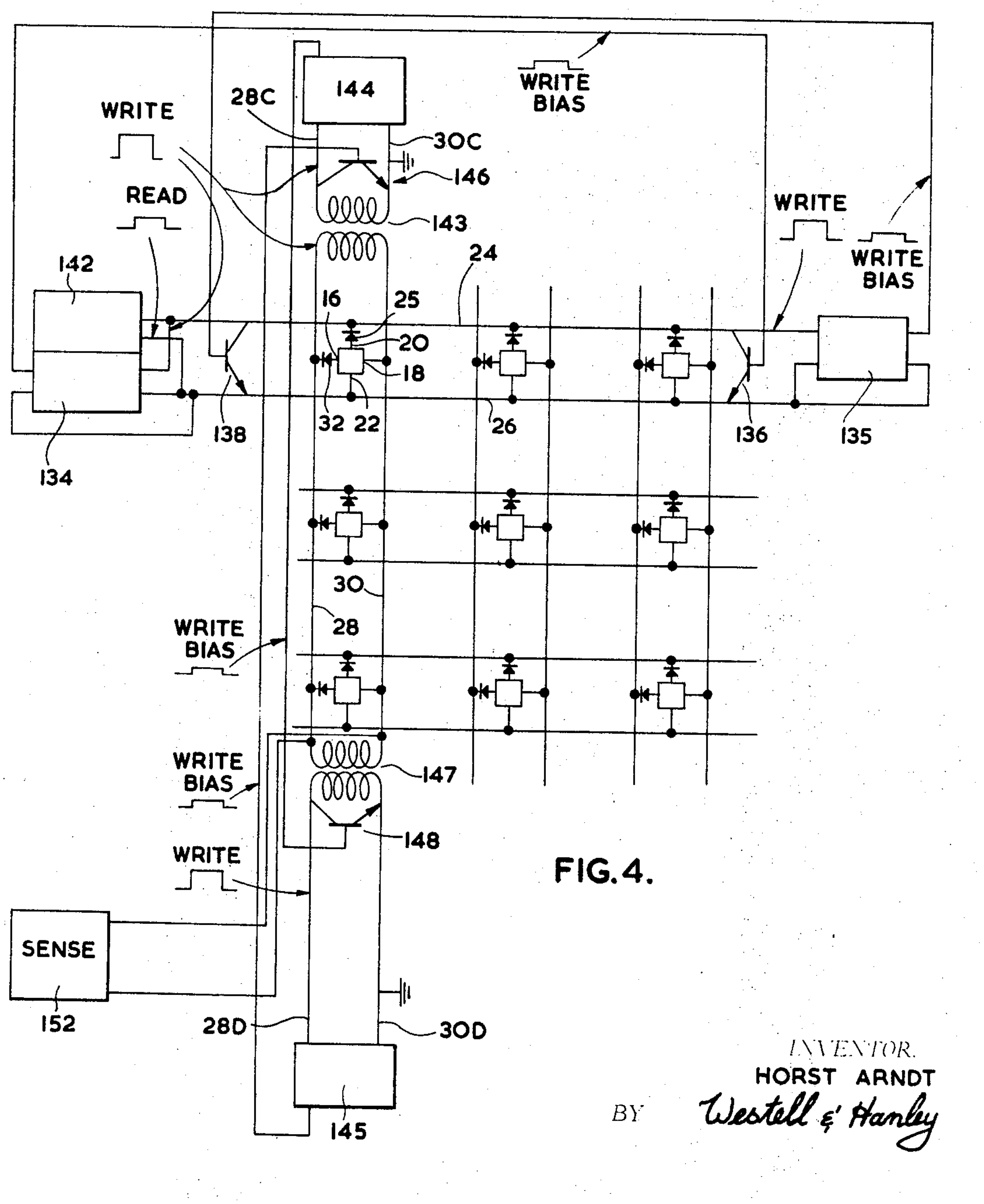
FIG. 4 shows an alternative form of memory to that shown in FIG. 2.

In FIG. 4 is shown a memory using Hall effect probes as described in relation to FIG. 2, but where the circuitry is designed to avoid the "loading" of the "write" current sources by the Hall probe elements.

In FIG. 4 is shown a rectangular array of Hall effect probes which will have over and underlying them, sheets of locally independently permanently magnetizable material such as ferrite as in the embodiment of FIG. 2. A pair of conductors 28 and 30 is provided for each column of elements arranged as described in FIG. 2 with conductor 30 connected to each Hall probe terminal 18 in the column and conductor 28 connected to each Hall probe terminal 16 in the column through diode 32, all the diodes in a given column being of the same polarity.

A pair of conductors 24 and 26 is provided for each row of elements. Conductor 26 is connected to the control terminal 22 of the Hall probe as before but conductor 24 is connected to each control terminal 20 through a diode 25 with the polarity of the diodes being the same for all Hall probe elements in the same row.

The circuitry of FIG. 2 is altered to ensure that magnetizing pulses are applied by both column and row pairs of conductors, in polarities opposite to the conducting polarity of diodes 32 and 25 respectively, while "read" pulses must be applied across the row conductors 24 and 26 in a polarity corresponding to conduction in diode 25.

To achieve this arrangement, each pair of row conductors 24 and 26 is provided with a magnetizing pulse source 134 applicable to one end of the conductors 24 and 26 and a magnetizing pulse source 135 applicable to the other end of the conductors 24 and 26. Conductors 24 and 26 are connectible remote from source 134 by a transistor switch 136 of the NPN type with collector connected to conductor 24 and emitter connected to conductor 26. The base of transistor switch 136 is connected to magnetizing or "write" pulse source 134. The operation is smilar to that of one polarity of a "write" pulse source in FIG. 2. When pulse source 134 places a positive "write" pulse on conductor 24 relative to conductor 26, the source 134 is also designed to provide a contemporaneous bias pulse to the base of transistor 136 to cause conduction therein. At the time of such conduction the magnetizing current is clockwise relative to the permanently magnetizable material characteristic of the row of Hall probe elements.

Similarly there is provided at the opposite end from "write" pulse source 135 a transistor switch 138, also NPN with its emitter connected to conductor 26, its collector connected to conductor 24 and its base connected to source 135 for bias pulses contemporaneous with that source's "write" pulse. It will be noted that when source 135 pulses conductor 24 positive relative to conductor 26 the switch 138 being then conducting, the magnetic current is then counter clockwise relative to the row locations on the permanently magnetizable material.

Similarly operating "write" pulse arrangements are provided for each column. One end of lines 28 and 30 is connected across the output winding of a pulse transformer 143 and the other end is connected across the output winding of a pulse transformer 147. A "write" pulse source 145 is connected through conductors 28D and 30D to the input of pulse transformer 147 and source 145 is connected to bias the base of a NPN transistor switch 146 connected across conductors 28C and 30C relative to the emitter (ground) switch 146 being located between pulse transformer 143 and a pulse source 144. Source 145 is designed so that a positive bias pulse to the base of transistor 148 relative to ground is substantially simultaneous with the positive pulse supplied by source 145 to line 28. Transistor switch 146 has its collector connected to conductor 28C and its emitter connected to conductor 30C. When a positive pulse is applied by source 145 to line 28 through pulse transformer 147, transistor switch 146, is then conducting due to the bias then supplied to the base of the switch 146 by source 145 then current flow about the permanently magnetizable material corresponding to the column is clockwise. The circuitry is designed so that conduction in switch 146 reflects a low impedance across transformer 143 in a sense to allow such clockwise conduction. A "write" pulse source 144 is connected through conductors 28C and 30C to the input of transformer 143 (with one of its conductors say 30C grounded) and is connected to bias the base of a NPN transistor switch 148 connected between conductors 28D and 30D between the Hall probes and transformer 147. Source 144 is designed so that a positive bias pulse to the base of transistor 148 (relative to ground) is substantially simultaneous with the positive pulse supplied to line 28 by source 144. The emitter of switch 148 is connected to conductor 30D and the collector of switch 148 is connected to conductor 28D. When a positive pulse is applied to line 28 by source 144 through transformer 143, transistor switch 148 is then conducting due to the bias supplied by source 144 to the base of switch 148, then conducting current flow about the permanently magnetizable material corresponding to the column is counter-clockwise. The circuitry is designed so that conduction in switch 148 reflects a low impedance across transformer 147 in a sense to allow such counter-clockwise conduction.

Also connected across lines 24 and 26 is "read" pulse source 142 designed, when actuated, to pulse conductor 26 positive with relation to conductor 24. Connected across lines 28 and 30 is a "sense" pulse detector 152. The purpose of the transformers 143 and 147 is to isolate the sense detector 152 from the "write" sources 144 and 145 and "write" source signals.

Each column and each row of the matrix will be energizable with "write" pulses by means similar to those described. Energization with "write" pulses of opposed ends of either row and column conductors may be achieved from the same pulse source by appropriate switching and selection means. Energization of either end of all row conductors, all column conductors or all row, and column conductors with a single "write" pulse source may be achieved with proper switching and distribution arrangements.

In operation, to "write" on a selected array location, (here the upper left for convenience of illustration and description) pulses of the indicated polarity are caused to be emitted by sources 134 and 145 for the appropriate row and column, causing in each case magnetization in the same sense at the permanently magnetizable material corresponding to the upper left hand array location. The strength of pulse energization relative to the hysteresis properties of the material is, as in the embodiment of FIG. 2 (see also FIG. 3) designed so that the energization by both pairs of conductors characteristic of such location is sufficient to switch the permanently magnetizable material from one state to the other; while energization by one pair of conductors only will not switch the material. Hence permanently magnetizable material affected by one only of the pulses in the two pairs of conductors will not be switched.

To "write" in the opposite sense at the upper left hand matrix location, the sources 135 and 144 are energized in each case to cause energizing current adjacent the permanently magnetizable material moving in a counter clockwise sense in both pairs of conductors.

In either "write" sense the pulses are such as to back-bias the relevant diodes 25 or 32 in all affected row or column positions, and hence the Hall probe elements do not "load" the "write" pulse sources.

When it is desired to "read" a position of the memory, for example, the upper left position, a "read" pulse is applied positively in conductor 26 relative to conductor 24, so that conduction may take place through diode 25. Switches 136 and 138 are open, since no bias appears at the base of either transistor. At the sense terminals of the Hall probe elements corresponding to the row energized by the "read" pulse, a signal of one sense or the other, depending on the local magnetic field, will appear at the sense terminals 16 and 18. Signals appearing at said terminals 16 and 18 of one polarity pass diode 32 and are detected at detectors 152, as one binary digit, the switches 148 and 146 being open in the absence of a bias signal. Signals appearing at said terminals 16 and 18 of the opposite polarity are blocked by diode 32 and the absence of such signal is detected at detectors 152 as the other binary digit. A "sense" signal passing one diode 32 back biases all the other diodes in a column as in the embodiment of FIG. 2. Since in each case the detectors determine the column and the "write" pulse determines the row any position in the array may be "read" in this way.

Although the embodiments of FIGS. 2 and 4 show and speak of a rectangular array it will be realized that this need not be physically so, within the scope of the invention if the Hall probe elements are connected so that the combination of first pair and a second pair of conductors is unique for any Hall probe element. When the Hall probe elements are not arranged in a rectangular array they will usually be one-to-one correspondence with the element.

It will be seen that the memory as described is non-destructive. It will be seen that by row selection for the "read" signal and column selection for the sense signal, the state of the magnetizable material at any position in the memory may be determined.

In all the embodiments herein it will be seen that the "read-out" is obtained without switching the magnetic material thus contributing to a rapid memory.

I claim:

1. A memory element comprising:

a Hall probe element having a pair of spaced electrical control connections in one direction and a pair of spaced sense connections in a transverse direction, permanently magnetizable material located, in relation to said probe, so that when magnetized in one or in an opposite sense, the field from said material will influence said probe;

a first pair of conductors so located on opposite sides of and relative to said permanently magnetizable material, so that when said pair of conductors is connected in series and energized, a magnetic field is created tending to magnetize said permanently magnetizable material in said one or said opposite sense;

one conductor of said first pair being connected to one connection of one of said pairs of Hall probe connections;

the other conductor of said first pair being connected to the other connection of said one of said pair of Hall probe connections;

a second pair of conductors, each conductor of said second pair of conductors being connected to one of said other pair of Hall connections;

wherein one of each of said first pair of conductors is connected to each Hall probe with which it is associated by a device allowing current flow therethrough in one polarity only.

2. A hall probe element having a pair of spaced electrical control connections in one direction and a pair of spaced sense connections in a transverse direction;

permanently magnetizable material located, in relation to said probe, so that when magnetized in one or in an opposite sense, the field from said element will influence said probe;

a first pair of conductors so located on opposite sides of and relative to said permanently magnetizable material, that when connected in series and energized, a magnetic field is created tending to magnetize said permanently magnetizable material in said one or said opposite sense;

one conductor of said first pair being connected to one connection of one of said pairs of Hall probe connections;

the other conductor of said first pair being connected to the other connection of said one of said pair of Hall probe connections;

a second pair of conductors so located on opposite sides of and relative to said permanently magnetizable material that when connected in series and energized, a magnetic field is created tending to magnetize said permanently magnetizable material in said one or said opposite sense;

one conductor of said second pair being connected to one connection of the other of said pairs of connections;

the other conductor of said second pair being connected to the other of said pairs of connections.

3. A plurality of Hall probe elements as defined in claim 2, a first pair of conductors and a second pair of conductors associated with each Hall probe element, the combination of a first pair of conductors and a second pair of conductors being unique for any Hall probe element in said plurality.

4. A plurality of Hall probes which individually may be considered as corresponding to positions in rows and columns;

a pair of opposed control voltage terminals;
a pair of opposed sense voltage terminals;
the line connecting one pair of terminals crossing the line connecting the other pair of terminals;
sheets of locally independently magnetizable material overlying and underlying said array, and located so that localized areas of said sheets may be independently magnetized to produce, locally independent magnetic fields each encompassing an individual Hall probe element;
a first pair of conductors corresponding to each row in the array, located when connected in series and electrically energized to tend to produce in said permanently magnetizable material a field affecting the Hall probes corresponding to said row;
a second pair of conductors corresponding to each column in the array located when connected in series and electrically energized, to tend to produce in said permanently magnetizable material a field affecting the Hall probes corresponding to said columns;
said Hall probes corresponding to a row having one of said control voltage terminals connected to one of said first pair of conductors and the other of said control voltage terminals connected to the other of said first pair of conductors;
said Hall probes corresponding to a column having one of said sense voltage terminals connected to one of said second pair of conductors and the other of said terminals connected to the other of said second pair of conductors;
means in one of the connections to a sense terminal of each Hall probe to allow current flow therethrough of only one polarity, such polarity being the same for all Hall probes corresponding to the same column.

5. Apparatus as claimed in claim 4 having means in one of the connections to a control terminal of each Hall probe to allow current flow therethrough of only one polarity such polarity being the same for all Hall probes in the same row.

6. A plurality of Hall probe elements each having a pair of spaced electrical control connections in one direction and a pair of spaced sense connections in a transverse direction;

permanently magnetizable material located, in relation to said probe, so that when magnetized in one or in an opposite sense, the field from said element will influence said probe;
a first pair of conductors so located on opposite sides of and relative to said permanently magnetizable material,
a first pair of conductors and a second pair of conductors associated with each Hall probe element, the combination of a first pair of conductors and a second pair of conductors being unique for any Hall probe element in said plurality, and where one of said first or second pair of conductors associated with a Hall probe element has one of said pair of conductors connected to said Hall probe element through a rectifying device allowing current flow-through said connector of one polarity only, and wherein all said rectifier devices associated with the same pair of conductors are poled in the same way relative to flow from one conductor of said pair, through the Hall element to the other conductor of said pair.

7. A device as claimed in claim 6 wherein said permanently magnetizable material comprises a pair of sheets of material sandwiching said Hall probes, said material being of the type which is independently locally magnetizable.

8. A plurality of Hall probe elements each having:

a pair of spaced electrical control connections in one direction and a pair of spaced sense connections in a transverse direction;
permanently magnetizable material located, in relation to said probe, so that when magnetized in one or in an opposite sense, the field from said element will influence said probe;
a first paid of conductors so located on opposite sides of and relative to said permanently magnetizable material,
wherein said elements may be considered in one-to-one correspondence to locations in rows and columns, wherein a said first pair of conductors corresponds to each such row and is associated with each of the Hall probe elements and permanently magnetizable material in correspondence with said row, wherein a said second pair of conductors corresponds to each such column and is associated with each Hall probe element and permanently magnetizable material in correspondence with said column;
and wherein the particular combination of a first pair of conductors and a second pair of conductors is unique for any element,
and wherein one of each said second pair of conductors is connected to each Hall probe with which it is associated by a device allowing current flow therethrough of one polarity only, the polarity of such devices being the same relative to conduction from one of such second pair of conductors to the other through said Hall element probe.

9. A device as claimed in claim 8 wherein said permanently magnetizable material comprises a pair of sheets of material sandwiching said Hall probes, said material being of the type which is independently locally magnetizable.

10. A Hall probe element having a pair of spaced electrical control connections in one direction and a pair of spaced sense connections in a transverse direction;

permanently magnetizable material located, in relation to said probe, so that when magnetized in one or in an opposite sense, the field from said element will influence said probe;
a first pair of conductors so located on opposite sides of and relative to said permanently magnetizable material,
wherein one of each of said first pair of conductors is connected to each Hall probe with which it is associated by a device allowing current flow therethrough in one polarity only.

11. A device as claimed in claim 10 wherein said permanently magnetizable material comprises a pair of sheets of material sandwiching said Hall probes, said material being of the type which is independently locally magnetizable.

References Cited

UNITED STATES PATENTS

| | | | |
|---|---|---|---|
| 2,545,369 | 3/1951 | Millar | 324—45 |
| 2,553,490 | 5/1951 | Wallace | 324—45 |
| 3,131,381 | 4/1964 | Bradley | 340—174 |
| 3,189,815 | 6/1965 | Barabutes et al. | 324—45 |
| 3,343,084 | 9/1967 | Gambale et al. | 324—103 |
| 3,123,748 | 3/1964 | Brownlow | 340—140 |
| 3,150,356 | 9/1964 | Newman | 340—174 |
| 3,337,856 | 8/1967 | Bate et al. | 340—174 |
| 3,439,349 | 4/1969 | Raillard et al. | 340—174 |

STANLEY M. URYNOWICZ, JR., Primary Examiner